Oct. 26, 1954
C. W. GARRETT
2,692,558
AIR INJECTOR FOR WATER PRESSURE SYSTEMS
Filed Feb. 19, 1951
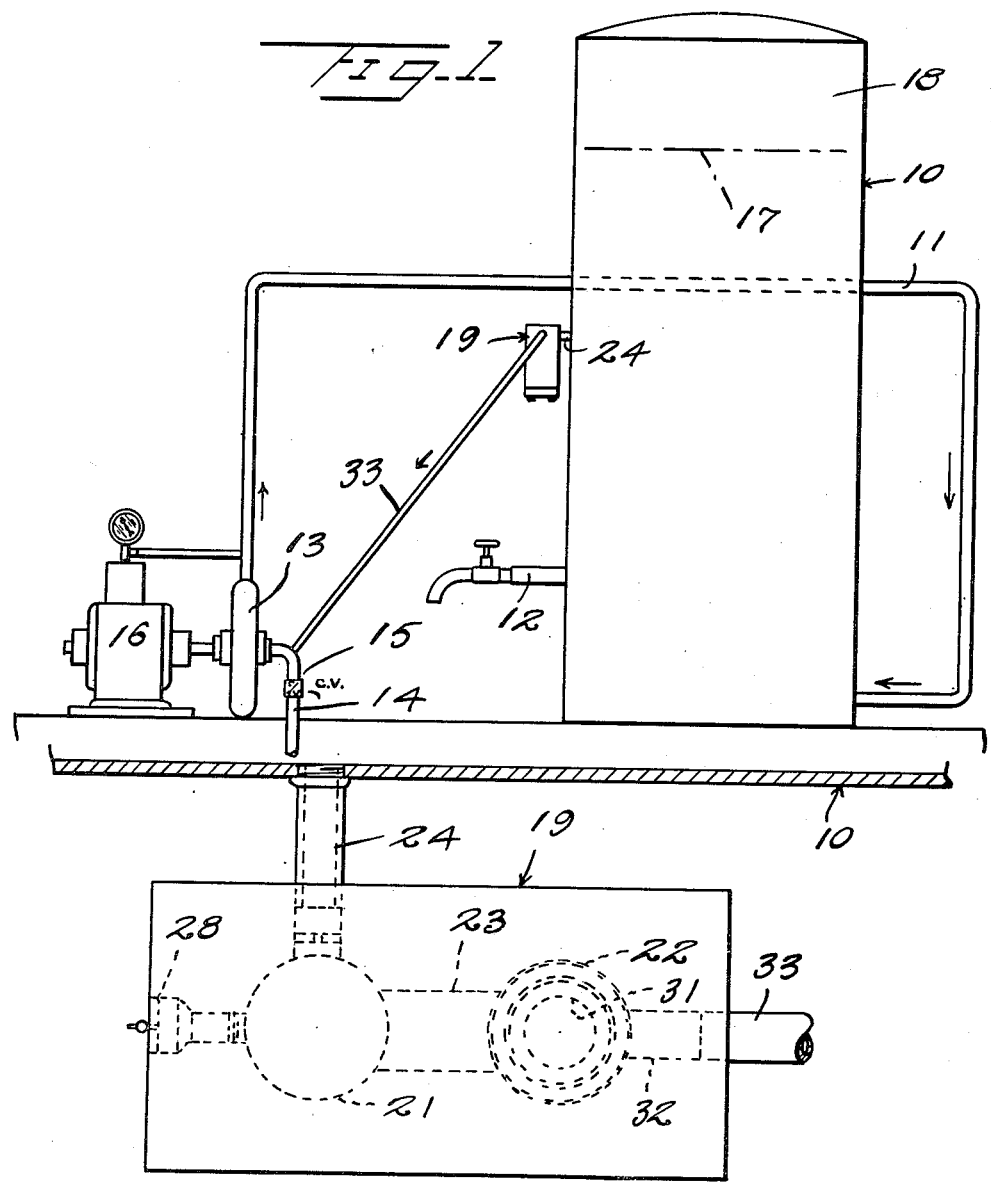
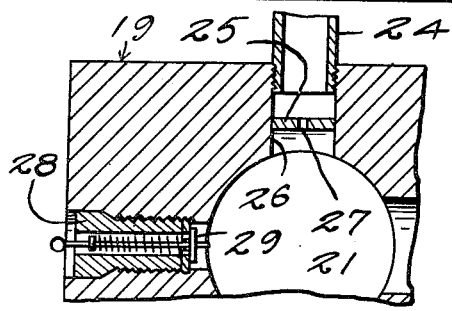
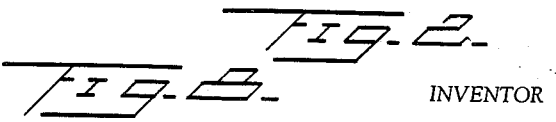
INVENTOR
C. W. Garrett
BY Kimmel & Crowell
ATTORNEYS

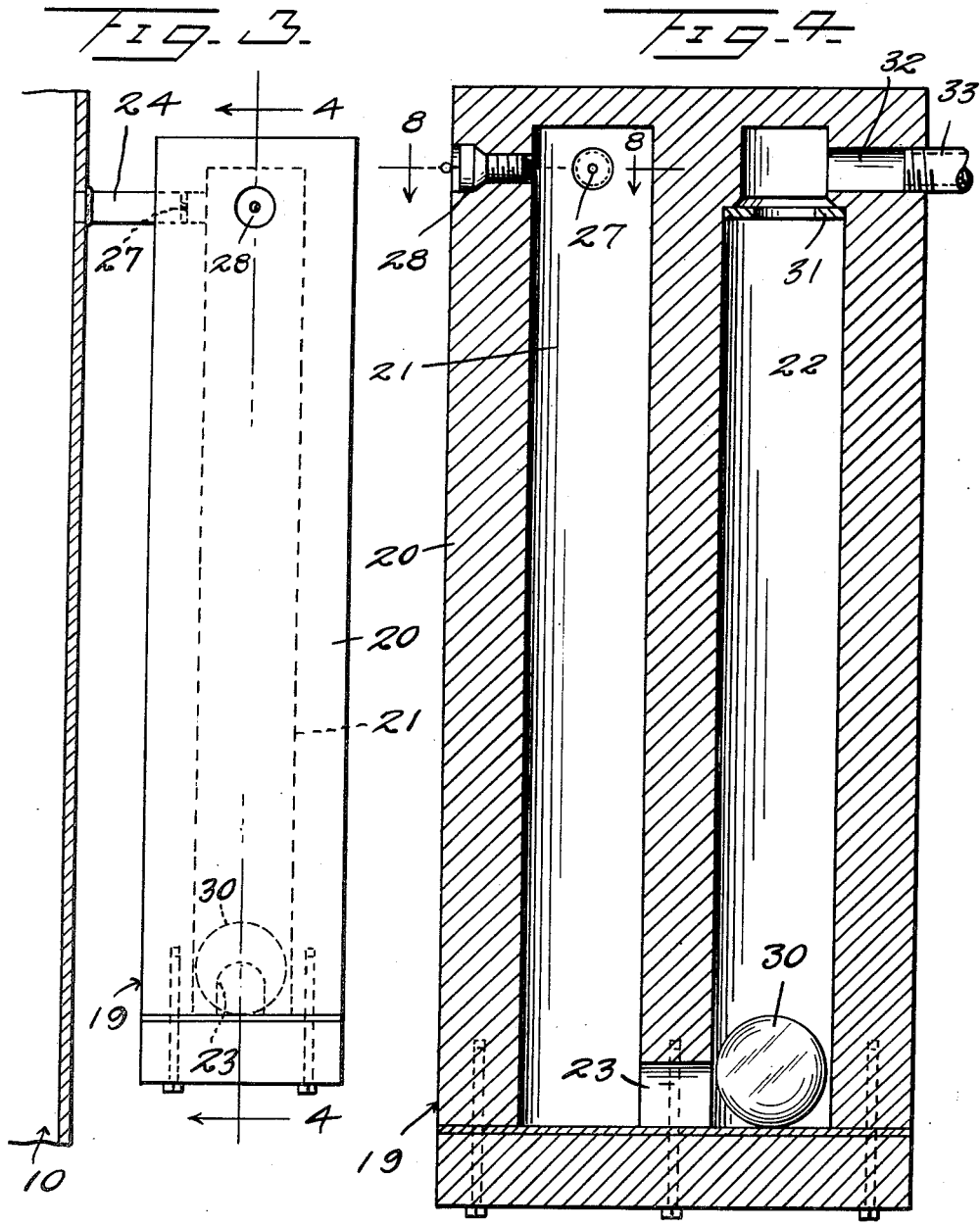

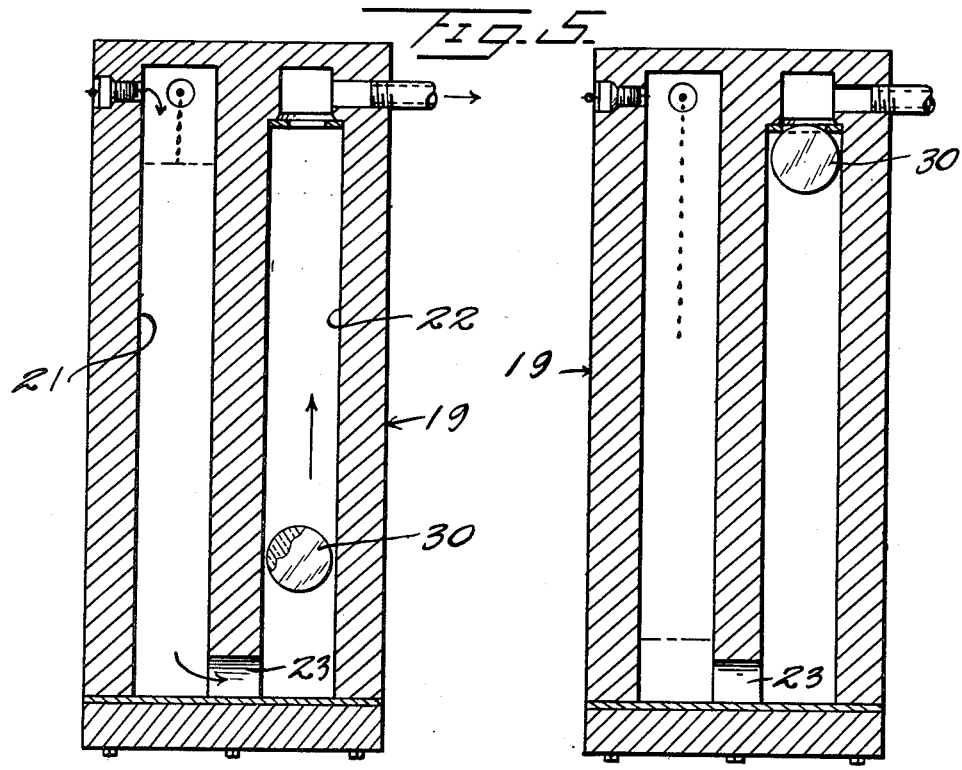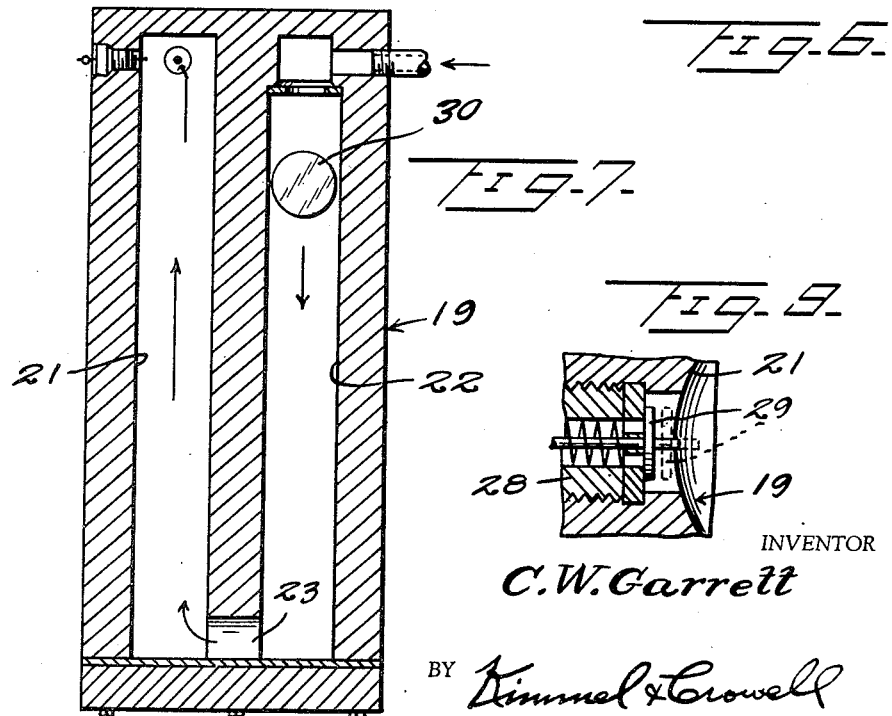

Patented Oct. 26, 1954

2,692,558

UNITED STATES PATENT OFFICE 2,692,558

AIR INJECTOR FOR WATER PRESSURE SYSTEMS

Clifton W. Garrett, Olney, Ill.

Application February 19, 1951, Serial No. 211,643

2 Claims. (Cl. 103—6)

This invention relates to pressure water systems.

In a pressurized water system having a centrifugal pump and a supply tank wherein the water is maintained under pressure, a head of air is maintained in the tank so that the water may be placed under a predetermined pressure. In the drawing of water from the tank and in the replacement of water in the tank, the air which constitutes the pressure head is gradually absorbed by the water, so that the air head is gradually reduced in volume, and unless some means is provided for replacing the air it is impossible to maintain the desired working pressure.

It is, therefore, an object of this invention to provide a means which will maintain a constant head of air in the supply tank.

Another object of this invention is to provide an automatically operable air injection means which is operable with operation of the pump to restore air to the tank.

Another object is to provide a device of the kind hereinafter described, which is made of plastic or other suitable transparent material to thereby provide a ready means of observing the functioning of the device without the need of dismantling the apparatus to find out if the air injector is properly working.

Another object is to provide an air injector for pressure water systems wherein the injector is of a simplified and highly stable construction, one not likely to get out of order and which will outlast others of a similar purpose.

A further object of this invention is to provide an air injection means for a water pressure tank which embodies a minimum of working parts so that the device will not get out of order and will last indefinitely.

With the above and other objects in view, my invention consists in the arrangement, combination and details of construction disclosed in the drawings and specification, and then more particularly pointed out in the appended claims.

In the drawings:

Figure 1 is a detailed side elevation of a pressure water system having an air injector interposed therein constructed according to an embodiment of this invention.

Figure 2 is a plan view of an injector.

Figure 3 is a side elevation of the injector.

Figure 4 is a vertical section taken on the line 4—4 of Figure 3 showing the injector in initial position.

Figure 5 is a view similar to Figure 4 showing the injector at the time the water pump is initially started in its pumping operation.

Figure 6 is a vertical section similar to Figure 4 showing the injector with the ball valve in closed position.

Figure 7 is a view similar to Figure 4 showing the ball valve in its initial downward movement after the pump has completed a pumping cycle.

Figure 8 is a fragmentary sectional view taken on the line 8—8 of Figure 4.

Figure 9 is a fragmentary sectional view taken through the air inlet valve.

Referring to the drawings the numeral 10 designates generally a closed water tank which has connected therewith a water supply pipe 11 and an outlet pipe 12. A centrifugal pump 13 is connected between the pipe 11 and the well pipe 14 and a check valve 15 is interposed in the well pipe 14 adjacent the pump 13 so as to prevent backward flow of the water from the pump 13 to the well pipe 14. The pump 13 is operated from a motor or power member 16. The tank 10 is adapted to have water under pressure disposed therein, and this water is normally disposed at a level indicated by the dot and dash line 17.

The space 18 above the water level 17 is filled with air so that the water within the tank 10 may be placed under a predetermined operating pressure. In the normal operation of the water system when water is taken from the tank 10 by the outlet 12 the pressure within the tank will drop and when a predetermined low pressure has been reached, the power member 16 is operated automatically to operate the pump 13 and bring the pressure of the water in the tank 10 up to its maximum operating pressure.

In the normal cyclic operation of the pump 13 and the dropping and raising of the water level 17, a quantity of the air above the water level will be absorbed in the water thereby decreasing the volume of air and affecting the efficiency of the pressure in the water system. In order to provide a means whereby air will be automatically injected into the tank 10, on each cyclic operation of the pump 13, I have provided an air injector generally designated as 19. The air injector 19 comprises a housing 20 which is shown as non-transparent but which may, if desired, be formed of transparent material and which is formed with a pair of vertically disposed elongated chambers 21 and 22. The chambers 21 and 22 are connected together at their lower ends by means of a connecting bore or channel 23. The housing 19 is secured to the outer side of the tank 10 by means of a nipple or short length of pipe 24.

A disc shaped plate 25 is mounted in a port 26 formed in the housing 20 communicating with the upper portion of chamber 21 and disc 25 is formed with a centrally disposed opening 27. The opening 27 is relatively small so that when the pump is operated as will be hereinafter described and a partial vacuum is created in chamber 21, the pressure on the water in tank 10 will force a small stream of water through the opening 27 into chamber 21 to thereby gradually fill up the evacuated space in chamber 21.

An air inlet valve 28 is carried by the housing 29 at a point adjacent the upper end of chamber 21 and includes a spring pressed valve member 29 which opens inwardly so as to limit air under atmospheric pressure into chamber 21. Chamber 22 has movably mounted therein a non-buoyant glass ball or spherical valve member 30 which is adapted to normally be disposed at the lower end of chamber 22. When water is being pumped by operation of pump 13 spherical valve member 30 will rise upwardly in chamber 22 until the valve member 30 engages a resilient valve seat member 31 which is disposed at the upper end of chamber 22.

An outlet port 32 is formed in the upper portion of housing 19 communicating with the upper end of chamber 22, and a suction pipe 33 is connected at one end to port 32 and at the other end to the suction side of pump 13 between check valve 15 and pump 13.

In the use and operation of this air injector the injector is secured by means of the pipe or nipple 24 to tank 10 below the normal water level 17. Pipe 33 is then connected between housing 19 and the suction side of pump 13. Assuming that pump 13 is inoperative, valve member 30 will be disposed in the position shown in Figure 4 at the lower end of chamber 22. When water is drained from the discharge pipe 12 from tank 10 so as to thereby effect a reduction in pressure of the air in chamber 18 power member 16 will be automatically operated to effect operation of pump 13. When pump 13 is initially started in operation valve member 30 which is initially at the bottom of chamber 22 will begin to rise in chamber 22 as shown in Figure 5, and the water level in chamber 21 will gradually drop downwardly in proportion to the rise of the valve member 30 in chamber 22.

The dropping of the water level in chamber 21 will be faster than the inflow of water into chamber 21 through the jet opening 27 so that there will thereby be created a partial vacuum in chamber 21 above the water level in this chamber. When a partial vacuum has been created in chamber 21, air valve member 29 will under atmospheric pressure move to open position to admit air into the chamber 21 above the water level.

Air will continue to enter chamber 21 until valve member 30 has risen to the uppermost position in contact with valve seat member 31. At this time the movement of water in chamber 21 and in chamber 22 is cut off, and chamber 21 will be filled to a maximum with air. It will be understood that in view of the small opening 27 in plate 25 there will be created a differential pressure between the tank 10, and chamber 21 so that as pressure is built up in tank 10 water will continue to flow through jet opening 27, and as pressure in tank 10 and chamber 21 is gradually equalized the air in chamber 21 above the water level will bubble or flow back to tank 10 and into the space 18 above the water level 17.

The above should be sufficiently explanatory to define the operation of the above described construction, but in order further to clarify the operation thereof it is pointed out that with the pump idle, the air valve inlet closed, the tubes full of water, and the ball resting at the bottom of the tube, whenever the pressure in the tank falls to approximately 20 lbs., for example, the automatic switch starts the motor and the pump, placing a suction or vacuum from the supply line to the pump, also from the suction pipe to the air injector.

The solid glass ball is, therefore, drawn toward the orifice 31, and the air inlet valve opens. Air from the outside starts to pass into the air tube because the orifice and tube connecting the air tube to the pressurized tank is sufficiently small that water from the tank can not replace the water being displaced from the tube by the pump. Therefore, as air is drawn in, the ball rises, and continues to rise, and air continues to enter the tube until the ball is seated in the rubber seat 31 at the top of the water tube. When the ball has seated itself, no more suction is placed on the tubes, therefore, the air inlet valve closes although water continues to issue into the air tube from the tank through the orifice where the air injector is connected to the tank until the air pressure in the tube and in the tank are equal.

The ball, air, and water remain in this position until the pump stops running due to the fact that the pressure in the tank has reached an approximate 40 lbs. per square inch and the automatic pressure switch has stopped the motor and the pump. As soon as the motor and the pump stops no further suction or vacuum is exerted upon the tube holding the ball in the seat. Therefore, the pressure inside the tank reequalizes through the pump and the line to the air injector and equalizes in all sections.

Since there is thus provided a column of water and the ball in one tube and a column of air in the other tube, the water and the ball start to fall, and the air is injected into the pressurized tank, through the small orifice 27 until the tubes are again completely full of water, at which time the air injector is prepared for a new cycle of operation when the pressure in the tank drops to approximately 20 lbs. per square inch, or any desired equivalent setting which permits the reactuation of the motor.

What is claimed is:

1. In a water pressure system for pumping water from a well, a tank, a pump, means operable by pressure in said tank to control said pump, a pipe connecting said tank and said pump, a second pipe extending from said pump to said well, an air injector means, a pipe connecting said air injector means with the suction side of the pump, a second pipe connecting said air injector means with said tank, said injector means comprising a housing formed with a pair of vertically disposed chambers connected together at their lower ends, a spherical non-floating valve number vertically movable in one of said chambers, a valve seat in said one chamber adjacent the upper end thereof, said housing having an opening to the atmosphere formed adjacent the upper end of the other of said chambers, a spring-pressed valve normally closing off the opening, said housing having a port communicating with the upper end of said other chamber, a plate in said port having a restricted port therethrough, said last mentioned port being of materially less cross-sectional area than the cross-sectional area of said pipe, connecting said air pipe together with said pump, operation of said pump drawing water from said first chamber and moving said valve member to closed position and simultaneously causing a partial vacuum in said other chamber to cause said air valve to move to open position, cessation of said pump action upon increase of pressure in said tank allowing said air valve to close, whereby pressure in said system is equalized to force air admitted by said air valve into said other chamber through said restricted port into said tank.

2. In a water pressure system for pumping water from a well, a tank, a pump, means operable by pressure in said tank to control said pump, a pipe connecting said tank and said pump, a second pipe extending from said pump to said well, an air injector means for the tank comprising a housing having a pair of ports, a pipe communicating one of said ports with the suction side of said pump, a second pipe communicating the other port with said tank, said housing having a pair of vertically disposed chambers therein, one of said chambers communicating with said one port, the other of said chambers communicating with the other of said ports, said housing having a passage communicating with the lower ends of said chambers, an air inlet passage provided in said housing in the upper end of said other chamber, a valve controlling said passage, a fluid operated non-floating spherical valve member movable in said one chamber under suction force to close said one port and simultaneously produce a partial vacuum in said other chamber to cause said air valve to open and admit air into said other chamber, and a plate in said other port having a restricted opening to restrict the flow of water from said tank to said other chamber cessation of said pump action upon increase of pressure in said tank allowing said air valve to close, whereby pressure in said system is equalized to force air admitted by said air valve into said other chamber through said restricted port into said tank.

References Cited in the file of this patent

UNITED STATES PATENTS

| Number | Name | Date |
| --- | --- | --- |
| 2,220,209 | Carpenter | Nov. 5, 1940 |
| 2,479,247 | Matthews | Aug. 16, 1949 |